United States Patent [19]

Butch, III et al.

[11] 4,411,954
[45] Oct. 25, 1983

[54] HOT MELT PRESSURE SENSITIVE ADHESIVE AND DIAPER TAPE CLOSURES COATED THEREWITH

[75] Inventors: Peter J. Butch, III, Valencia, Pa.; Paul P. Puletti, Glen Gardner, N.J.

[73] Assignee: National Starch and Chemical Corporation, Bridgewater, N.J.

[21] Appl. No.: 408,357

[22] Filed: Aug. 16, 1982

[51] Int. Cl.$^3$ .............................. C09J 7/02; C08F 4/00
[52] U.S. Cl. .................................... 428/343; 428/346; 428/349; 428/355; 428/913; 428/914; 525/332.9; 525/339; 526/237
[58] Field of Search ............... 428/355, 343, 346, 913, 428/914, 349; 526/237; 525/339, 332.9

[56] References Cited

U.S. PATENT DOCUMENTS

| | | | |
|---|---|---|---|
| 3,239,478 | 3/1966 | Harlan | 428/355 X |
| 3,577,398 | 5/1971 | Pace et al. | 526/237 |
| 3,595,942 | 7/1971 | Wald et al. | 525/332.9 |
| 3,700,633 | 10/1972 | Wald et al. | 525/339 |
| 4,163,077 | 7/1979 | Antonsen et al. | 428/355 |

*Primary Examiner*—Thomas J. Herbert, Jr.
*Attorney, Agent, or Firm*—Edwin M. Szala; Ellen T. Dec

[57] ABSTRACT

Hot melt pressure sensitive adhesives are formulated using as a base resin a mixture of a styrene-isoprene-styrene block copolymer together with a specific selectively hydrogenated block copolymer within critically defined ratios. The resultant adhesives as well as the tapes coated therewith are characterized by a unique combination of adhesion and heat and oxidative resistance properties.

10 Claims, No Drawings

HOT MELT PRESSURE SENSITIVE ADHESIVE AND DIAPER TAPE CLOSURES COATED THEREWITH

BACKGROUND OF THE INVENTION

This invention relates to hot melt pressure sensitive adhesive compositions, particularly to hot melt pressure sensitive adhesive compositions suitable for coating on tapes or labels and most particularly on tapes to be used as closures for disposable diapers.

Disposable diapers typically comprise an absorbent filler material and an outer moisture-impervious polyethylene film. The diapers are generally so configured that when they are placed on an infant, they are folded so that two adjacent edges are either juxtaposed or overlapped, with a strip of normally tacky and pressure-sensitive adhesive tape being used to hold the edges together.

Hot melt adhesives utilized heretofore for such applications have been based primarily on block copolymers, particularly those of the styrene-isoprene-styrene types, which copolymers are blended with tackifying resins, oils and antioxidants to provide the final adhesive product. Typical of such adhesives are those described in U.S. Pat. No. 4,163,077.

While the adhesives based on the styrene-isoprene-styrene copolymers possess good adhesion to a wide variety of substrates including the polyethylene diaper films, the adhesives are sensitive to oxidation and degradation both during processing and in use. Other adhesive compositions, based on partially hydrogenated block copolymers are known to possess improved resistance to oxidation and degradation but are deficient when formulated into adhesives which are to be used in adhering polyolefin substrates.

It is an object of the present invention to provide hot melt pressure sensitive adhesive compositions which exhibit a combination of advantageous properties including adhesion to polyolefin substrates together with superior heat and oxidative resistance.

SUMMARY OF THE INVENTION

We have now found that a unique combination of adhesion and heat and oxidative resistance properties can be achieved when a hot melt pressure sensitive adhesive is formulated using as a base resin a mixture of A-B-A type block copolymers, specifically a styrene-isoprene-styrene block copolymer together with a specific selectively hydrogenated block copolymer within critically defined ratios.

Thus, the pressure sensitive hot melt adhesives of the present invention comprise:

(a) 15 to 40% by weight of a mixture of an A-B-A styrene-isoprene-styrene copolymer and a selectively hydrogenated A-B-A type block copolymer wherein the non-elastomeric block A units in both A-B-A copolymers are present in amounts less than about 25% by weight and wherein the weight ratio of the styrene-isoprene-styrene copolymer to the selectively hydrogenated copolymer is within the range of 10:90 to 40:60;

(b) 30 to 70% by weight of a tackifying resin;

(c) 5 to 30% by weight of a plasticizing oil or liquid polyterpene tackifying resin; and (d) 0.05 to 2.0% by weight of an antioxidant.

As an additional embodiment of the invention, there is disclosed a tape, particularly a tape for securing disposable diapers, which tape is coated with a pressure sensitive adhesive as described herein.

DETAILED DESCRIPTION OF THE PREFERRED EMBODIMENTS

The first A-B-A block copolymer used herein is of the styrene-isoprene-styrene type. Typical copolymers and the synthesis thereof are taught by Harlan in U.S. Pat. No. 3,239,478. It is to be stressed, however, that the copolymers useful herein are limited to those of the styrene-isoprene-styrene types and only to those wherein the isoprene component is present in amounts less than about 25% by weight of the total block copolymer. Representative copolymers are available commercially from Shell Chemical under the tradenames Kraton D1107; Kraton D1111 and Kraton D1112 and have styrene-isoprene ratios of 14:86, 21:79 and 15:85 respectively.

The second class of copolymers required herein is also of the A-B-A variety but in these cases, the block copolymers are selectively hydrogenated as taught, for example, in U.S. Pat. Nos. 3,595,942 and 3,700,633. The base resin which is hydrogenated may be of the styrene-isoprene-styrene type or of the styrene-butadiene-styrene type, since the selective hydrogenation is effective in hydrogenating substantially all of the aliphatic double bonds provided by the elastomeric isoprene or ethylene-butylene block units. The only criteria found to be necessary for these copolymers to be useful herein is that the hydrogenated copolymers have a relatively low ratio of non-elastomeric A units to elastomeric B units and that the ratio be generally within the range required of the first A-B-A copolymer, i.e. that the non-elastomeric block A units are present in amounts less than about 25% by weight. Presently, the only commercially available copolymer is provided by Shell Chemical under the tradename Kraton G1657, identified as a styrene-/ethylene-butylene/styrene copolymer and has a ratio of non-elastomeric A units to elastomeric B units of about 14:86.

In formulating adhesives for use in the invention, the total level of the block copolymers should range from about 15 to 40, preferably 20-30%, by weight of the adhesive with the relative amounts of the first copolymer to the second copolymer within the weight range of 10:90 to 40:60, preferably 25:75 to 35:65, and most preferably 30:70. When the first copolymer is present in levels above about 40% of the mixture, a phasing in the melt occurs rendering the product non-uniform and unstable. When less than the 10% level of the first copolymer is used, the performance of the adhesive on polyolefin substrates is unacceptable.

The tackifying resins which are present in the hot melt adhesive used herein serve to extend the adhesive properties of the block copolymer. As contemplated, the term "tackifying resin" includes: (1) natural and modified rosins such, for example, as gum rosin, wood rosin, tall-oil rosin, distilled rosin, hydrogenated rosin, dimerized rosin, and polymerized rosin; (2) glycerol and pentaerythritol esters of natural and modified rosins, such, for example, as the glycerol ester of pale wood rosin, the glycerol ester of hydrogenated rosin, the glycerol ester of polymerized rosin, the pentaerythritol ester of hydrogenated rosin, and the phenolic modified pentaerythritol ester of rosin; (3) polyterpene resins having a softening point, as determined by ASTM method E28 58T, of from about 60° to 140° C. the latter polyterpene resins generally resulting from the polymerization of terpene hydrocarbons, such as the bicyclic mono-terpene known as pinene in the presence of Fridel-Crafts catalysts at moderately low temperatures. (4) phenolic-modified terpene resins such, for example, as the resin product resulting from the condensation in an acidic medium, of a bicyclic terpene and a phenol; (5) aliphatic petroleum hydrocarbon resins having a Ball and Ring softening point of from about 60° to 140° C., the latter resins resulting from the polymerization of monomers consisting primarily of olefins and diolefins as well as the hydrogenated derivatives thereof; (6) aromatic petroleum hydrocarbon resins and the hydrogenated derivatives thereof; and (7) aliphatic petroleum hydrocarbon resins and the hydrogenated derivatives thereof.

Especially preferred are resins which are polymerized from a stream of aliphatic petroleum derivatives in the form of dienes and mono-olefins having 5 or 6 carbon atoms generally in accordance with the teachings U.S. Pat. No. 3,577,398. The resulting solid hydrocarbon resin consists essentially of polymerized structures derived from these aliphatic dienes and mono-olefins of 5 or 6 carbon atoms and since the dienes are more reactive, at least 40 percent by weight and preferably a major proportion of said structures are derived from the dienes. In this type of resin, the dienes are piperylene and/or isoprene. However, in some formulations, the percentage of isoprene is extremely low. In the solid resin of this embodiment the molecular weight may range between about 900 and 1300 with the mean number average molecular weight being about 1100. This solid resin also has a softening point in the neighborhood of 100° C. In one preferred form, i.e., Wingtack 95 offered by Goodyear Chemical Company, the softening point is 95° C.

The plasticizing oils useful herein are of the naphthenic or paraffinic process oil variety. Also useful herein are the polyterpene-type tackifying resins which are liquid at room temperature. Typical of such liquid tackifiers is Wingtack 10 available from Goodyear Tire and Rubber Co. It consists essentially of polymerized structures derived from aliphatic dienes and mono-olefins of 5 or 6 carbon atoms, at least 40 percent by weight and preferably a major proportion, i.e. about 75%, of which are derived from piperylene or from piperylene and isoprene. The resin is liquid at 25° C., has a number average molecular weight of about 530 and appears to have at least about 25% unsaturation. It is further to be noted that minor amounts of waxes particularly microcrystalline waxes, paraffin, synthetic low molecular weight polyethylene and Fischer-Tropsch waxes, etc. may be used for further diluent properties or in order to reduce the melt viscosity or peel characteristics of the hot melt adhesive compositions without appreciably decreasing their adhesive binding characteristics. If used, they are generally present in levels of less than about 5% by weight of the total adhesive composition.

Among the applicable antioxidants are included high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency and correspondingly, its reactivity, this steric hindrance thus providing the phenolic compound with its stabilizing properties. Representative hindered phenols include: 1,3,5-trimethyl-2,4,6-tris(3,5-di-tert-butyl-4-hydroxybenzyl)benziene; pentaerythrityl tetrabis-3(3,5-di-tert-butyl-4-hydroxypenyl)-propionate, n-octadecyl-3(3,5-di-tert-butyl-4-hydroxyphenyl)propionate, 4,4'-methylenebis(2,6-di-tert-butylphenol); 2,2'-methylenebis(4-methyl-6-tert-butylphenol); 4,4'-thiobis(6-tert-butyl-o-cresol); 2,6-di-tert-butylphenol; 6-(4-hydroxyphenoxy)-2,4-bis(n-octylthio)-1,3,5 triazine; 2,4,6-tris(4-hydroxy-3,5,-di-tert-butylphenoxy)-1,3,5-triazine; di-n-octadecyl-3,5-di-tert-butyl-4-hydroxy-benzylphosphonate; 2-(n-octylthio)ethyl-3,5-di-tert-butyl-4-hydroxy-benzoate, and sorbitol hexa-[3-(3,5-di-tert-butyl-4-hydroxy-phenyl)propionate.]

The performance of these antioxidants may be further enhanced by utilizing, in conjunction therewith (1) synergists such, for example, as thiodipropionate esters and phosphites; and (2) chelating agents and metal deactivators such, for example, as ethylenediamine tetraacetic acid.

Optional additives may be incorporated into the hot melt compositions in order to modify certain properties thereof. Among these additives may be included colorants such as titanium dioxide; and fillers such as talc and clay, etc.

With respect to proportions, the hot melt adhesives taught herein typically contain the mixture of block copolymers in amounts from 15 to 40%, preferably 20-30%; the tackifying resin in amounts from 30 to 70%, preferably 50-60%; the oil or liquid tackifying resin in amounts from 5 to 30%, preferably 15-25%, and the antioxidant in amounts of 0.5 to 2%, preferably about 0.5%, the latter concentrations being based on a 100% solids total weight of the hot melt composition.

These hot melt ahesive compositions may be formulated using techniques known in the art. An exemplary procedure involves placing approximately half of the total tackifying resin concentration in a jacketed mixing kettle, preferably in a jacketed heavy duty mixer of the Baker-Perkins or Day type, which is equipped with rotors and thereupon raising the temperature to a range of from about 250° to 350° F., the precise temperature utilized depending on the melting point of the particular tackifying resin. When the resin has melted, stirring is initiated and the block polymer and stabilizer are added together with any optional additives whose presence may be desired, the addition of the latter components being extended over a prolonged period in order to avoid the formation of lumps. Mixing and heating are continued until a smooth, homogeneous mass is obtained whereupon the remainder of the tackifying resin and the oil are thoroughly and uniformly admixed therewith. The resultant hot melt adhesives are generally produced with an oil in bulk form and packaged in release coated tube or boxes.

There are a number of methods which may be employed to coat the resulting hot melt pressure-sensitive adhesive composition onto a flexible backing sheet to form a pressure-sensitive sheet or tape. For instance, coating techniques such as hot reverse roll coating, hot gravure coating and hot knife coating may be employed. Furthermore, these techniques may be varied such as by using a hot roller or rod in place of a conventional blade in the so-called knife coating process. However, a preferred technique is to pump the hot melt composition through a hot die and then wipe the sheet over the die to pick up an adhesive layer of the desired weight or thickness. Generally speaking, the amount of adhesive applied to the sheet by the technique will depend upon the die opening and internal pressure and the speed of the sheet passing the die.

The tapes prepared thereby may be either structures in which the adhesive is firmly bonded to a conventional backing or a structure in which the adhesive is removably bonded to the release-coated surface of a backing, the latter type being known as "transfer tapes". The backing substrate itself may be any of the conventionally employed materials such as polypropylene or treated crepe paper.

In the examples that follow, the adhesives prepared were subjected to the tests described below:

Heat Stability

Sixty grams of the hot melt adhesive were placed in a 4 ounce glass jar and loosely covered with aluminum foil. The jar was then placed in a 350° F. circulating air oven for 24 hours. When removed from the oven a Brookfield Thermosel viscosity (Spindle #27, rpm as listed) was then run at 325° F.

Adhesive Strength

The adhesion to stainless steel and to high density polyethylene film was measured by peeling the tape backing over itself 180° at a constant speed (by a force applied to the free end of the tape) from a smooth steel surface or HDPE to which it has been applied by a fixed pressure. For the techniques used in conducting this test, see the 180° peel adhesion test PSTC-1 of the Pressure Sensitive Tape Council.

4 PSI Hold

The hold was measured at room temperature, i.e. 25° C., by noting the time in hours that it takes for a ½ inch wide strip of tape to be pulled from a stainless steel plate by a 1000 gram weight attached to the bottom of the tape.

The following examples will further illustrate the embodiments of the invention. In these examples all parts given are by weight and all temperatures in degrees Celsius unless otherwise indicated.

EXAMPLE I

This example illustrates the preparation of hot melt adhesive compositions using varying ratios of the two block copolymer components.

In this example, a heavy duty mixer which had been heated to 150° C. and which was equipped with a stirring paddle was charged with half of the tackifying resin. After melting of the resin, stirring was then initiated whereupon the block copolymers and the Irganox (antioxidants) were added slowly. Heating and stirring were continued until a homogeneous mass was obtained whereupon the remainder of the tackifying resin and the oil were admixed therewith. The molten mixture was then poured into a siliconized paper tube and cooled to room temperature.

The precise amounts of each component are shown in Table I as are the testing results obtained. As can be seen from the data, an increase in the level of the Kraton 1107 above about 40% of the rubber blend causes a dramatic decrease in the viscosity after 24 hours at 350° F. indicating substantial polymer degradation. At levels of Kraton 1107 below about 15%, the adhesion to the polyolefin substrate is poor.

EXAMPLE II

This example shows a variation in the ratio of the total rubber content (i.e. the mixture of the two block copolymers) to the resin and oil used in the adhesives of the invention. The amounts and tests results are shown in Table II.

The results show that as rubber is increased viscosity increases, peel goes down and hold goes up. All had good resistance to degradation after heat aging.

TABLE I

| SAME FORMULATION WITH VARIATION IN KRATON G1657/KRATON D 1107 | | | | | | | | |
|---|---|---|---|---|---|---|---|---|
| | A | B | C | D | E | F | G | H |
| Kraton G1657 | 25 | 20 | 18.75 | 17.5 | 15.0 | 12.5 | 6.25 | — |
| Kraton D1107 | — | 5 | 6.25 | 7.5 | 10.0 | 12.5 | 18.75 | 25 |
| Wingtack 95 | 55.0 | 55.0 | 55.0 | 55.0 | 55.0 | 55.0 | 55.0 | 55.0 |
| White Mineral Oil (Kaydol) | 20.0 | 20.0 | 20.0 | 20.0 | 20.0 | 20.0 | 20.0 | 20.0 |
| Irganox 1010 | 0.5 | 0.5 | 0.5 | 0.5 | 0.5 | 0.5 | 0.5 | 0.5 |
| Initial Visc. 325° F.* | 10,500 | 11,000 | 11,425 | 10,500 | 9,000 | 9,275 | 8,525 | 6,563 |
| After 24 hrs. @ 350° F. | 9,625 | 9,425 | 9,000 | 9,000 | 7,750 | 6,725 | 3,875** | 1,775** |
| Adhesion to S/S PSTC #1 | 72.0 oz. | 91.0 oz. | 92.0 oz. | 96.0 oz. | 97.2 | 105.0 oz. | 115.0 oz. | 144.0 oz.*** |
| Adhesion to HDPE film | 38.0 oz. | 52.5 oz. | 62.5 oz. | 68.0 oz. | 70. oz. | 73. oz. | 78.0 oz. | 80.0 oz. |
| 4 PSI hold S/S (hrs.) | 17.0 | 19.0 | 20.0 | 25.0 | 18.0 | 5.0 | 4.5 | 3.0 |

*All Brookfield viscosity measurements were run at 10 rpm except those designated
**which were run at 50 rpm.
***Transfer

TABLE II

| | I | J | K |
|---|---|---|---|
| Kraton G1657 | 14.0 | 21.0 | 28.0 |
| Kraton D1107 | 6.0 | 9.0 | 12.0 |
| Wingtack 95 | 58.5 | 52.5 | 45.0 |
| White Mineral Oil (Kaydol) | 21.5 | 17.5 | 15.0 |
| Irganox 1010 | .5 | .5 | .5 |
| Test Results | | | |
| Visc. @ 325° F. | 4,212 cps. (20 rpm) | 23,750 cps. (5 rpm) | 103,500 cps. (1 rpm) |
| Total PPH Rubber | 20 | 30 | 40 |
| Aged 24 hrs. @ 350° F. | 3,500 (20 rpm) | 19,000 (5 rpm) | 45,000 cps. (2.5 rpm) |
| Adhesion to S/S | 125.0 | 80.0 oz. | 70.0 oz. |
| Adhesion HDPE film | 70.0 oz. | 65.0 oz. | 45.0 |
| 4 PSI hold hrs. | 8 hrs. | 24 hrs. | 72 hrs.+ |

EXAMPLE III

In this example an adhesive was prepared using formulation D of Table I and substituting a variety of different tackifying resins including Arkon P-85 (Arakawa) hydrogenated aromatic resin, and Nirez 1115 (an alpha pinene resin). Comparable results were obtained, indicating a wide variety of tackifying resins can be used.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

We claim:

1. Pressure sensitive tape comprising a sheet backing coated with a layer of normally tacky and hot melt pressure-sensitive adhesive comprising
(a) 15 to 40% by weight of a mixture of an A-B-A styrene-isoprene-styrene copolymer and a selectively hydrogenated A-B-A type block copolymer wherein the non-elastomeric block A units in both A-B-A copolymers are present in amounts less than about 25% by weight and wherein the weight ratio of the styrene-isoprene-styrene copolymer to the selectively hydrogenated copolymer is within the range of 10:90 to 40:60;
(b) 30 to 70% by weight of a tackifying resin;
(c) 5 to 30% by weight of a plasticizing oil or liquid polyterpene tackifying resin; and
(d) 0.05 to 2.0% by weight of an antioxidant.

2. The pressure sensitive tape of claim 1 wherein the adhesive comprises the mixture of block copolymers in amounts from 20 to 30%; the tackifying resin in amounts from 50 to 60%; the oil or liquid tackifying resin in amounts from 15 to 25%, and the antioxidant in amounts of about 0.5%, by weight of the hot melt composition.

3. A hot melt pressure sensitive adhesive composition comprising
(a) 15 to 40% by weight of a mixture of an A-B-A styrene-isoprene-styrene copolymer and a selectively hydrogenated A-B-A type block copolymer wherein the non-elastomeric block A units in both A-B-A copolymers are present in amounts less than about 25% by weight and wherein the weight ratio of the styrene-isoprene-styrene copolymer to the selectively hydrogenated copolymer is within the range of 10:90 to 40:60;
(b) 30 to 70% by weight of a tackifying resin;
(c) 5 to 30% by weight of a plasticizing oil or liquid polyterpene tackifying resin; and
(d) 0.05 to 2.0% by weight of an antioxidant.

4. The hot melt adhesive composition of claim 3 wherein the ratio of non-elastomeric block A units to elastomeric block B units in the selectively hydrogenated copolymer is 14:86.

5. The hot melt adhesive composition of claim 3 wherein the ratio of the styrene-isoprene-styrene copolymer to the selectively hydrogenated copolymer is within the range of 25:75 to 35:65.

6. The hot melt adhesive composition of claim 3 wherein the ratio of the styrene-isoprene-styrene copolymer to the selectively hydrogenated copolymer is 30:70.

7. The hot melt adhesive composition of claim 3 comprising a mixture of block copolymers in amounts from 20 to 30%; the tackifying resin in amounts from 50 to 60%; the oil or liquid tackifying resin in amounts, from 15 to 25%, and the antioxidant in amounts of about 0.5%, by weight of the hot melt composition.

8. The hot melt adhesive composition of claim 3 wherein the tackifying resin is selected from the class consisting of natural and modified rosins; glycerol and pentaerythritol esters of natural and modified rosins; polyterpene resins having a softening point, as determined by ASTM method E28 58T, of from about 60° to 140° C; aliphatic petroleum hydrocarbon resins having a Ball and Ring softening point of from about 60° to 140° C. and the hydrogenated derivatives thereof, aromatic petroleum hydrocarbon resins and the hydrogenated derivatives thereof; and alicyclic petroleum hydrocarbon resins and the hydrogenated derivatives thereof.

9. The hot melt adhesive composition of claim 3 wherein the plasticizing oil is a naphthenic or paraffinic process oil.

10. The hot melt adhesive composition of claim 3 wherein the liquid polyterpene tackifying resin consists essentially of polymerized structures derived from aliphatic dienes and mono-olefins of 5 to 6 carbon atoms.

* * * * *